(12) United States Patent
Kawasaki et al.

(10) Patent No.: US 7,173,665 B2
(45) Date of Patent: Feb. 6, 2007

(54) FOLDING MOBILE COMMUNICATION TERMINAL

(75) Inventors: Hideji Kawasaki, Neyagawa (JP); Kenji Kiyota, Shijyonawate (JP)

(73) Assignee: Sanyo Electric Co., Ltd., Osaka (JP)

( * ) Notice: Subject to any disclaimer, the term of this patent is extended or adjusted under 35 U.S.C. 154(b) by 623 days.

(21) Appl. No.: 10/104,282

(22) Filed: Mar. 22, 2002

(65) Prior Publication Data

US 2002/0142810 A1 Oct. 3, 2002

(30) Foreign Application Priority Data

Mar. 30, 2001 (JP) .............................. 2001-102205
Mar. 30, 2001 (JP) .............................. 2001-102206

(51) Int. Cl.
*H04N 5/225* (2006.01)
*H04N 5/222* (2006.01)
*H04N 7/14* (2006.01)
*H04M 1/00* (2006.01)

(52) U.S. Cl. ................. 348/376; 348/14.02; 348/14.07; 348/333.06; 455/556.1; 455/575.3

(58) Field of Classification Search ............. 455/550.1, 455/556.1, 556.2, 566, 575.1, 575.3, 90.3; 348/14.01, 14.02, 14.07, 207.99, 333.01, 348/333.06, 373, 376
See application file for complete search history.

(56) References Cited

U.S. PATENT DOCUMENTS

| | | | | |
|---|---|---|---|---|
| 6,069,648 A | * | 5/2000 | Suso et al. | 348/14.02 |
| 6,466,202 B1 | * | 10/2002 | Suso et al. | 345/169 |
| 6,549,789 B1 | * | 4/2003 | Kfoury | 455/550.1 |
| 6,782,281 B1 | * | 8/2004 | Nagasawa | 455/575.3 |
| 6,812,954 B1 | * | 11/2004 | Priestman et al. | 348/14.01 |
| 2001/0004269 A1 | * | 6/2001 | Shibata et al. | 348/333.06 |
| 2001/0005454 A1 | * | 6/2001 | Nishino et al. | 396/287 |
| 2002/0051060 A1 | * | 5/2002 | Wada | 348/207 |

\* cited by examiner

*Primary Examiner*—David Ometz
*Assistant Examiner*—Justin Misleh

(57) ABSTRACT

A portable communication terminal having an image-taking function is composed of a camera unit that takes an image of a subject through a photographic lens, and two displays, the first display being positioned on same a front surface of housing of the portable communication terminal as the photographic lens and being visible in a same view as the photographic lens, and the second display being positioned on a back surface of the housing. The mobile communication terminal has a function of having the image taken by the camera unit displayed on at least one of the displays.

8 Claims, 11 Drawing Sheets

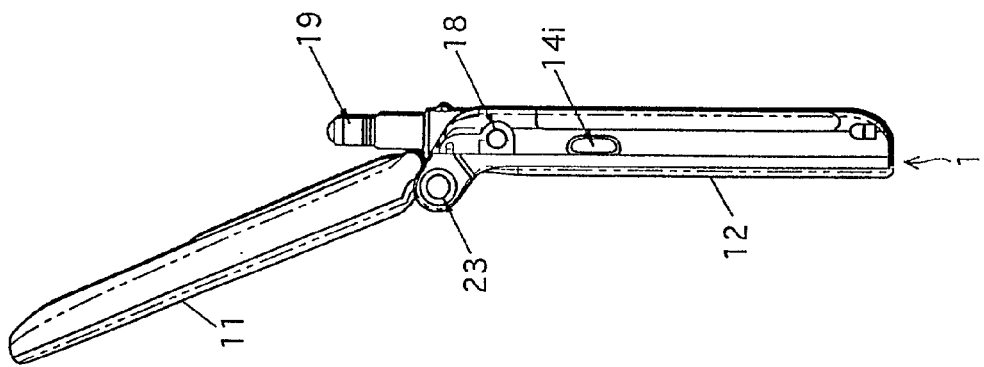
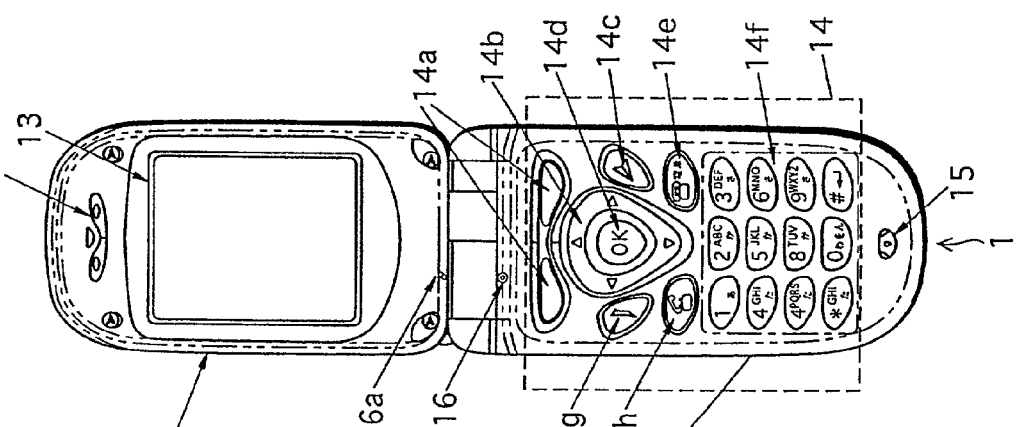
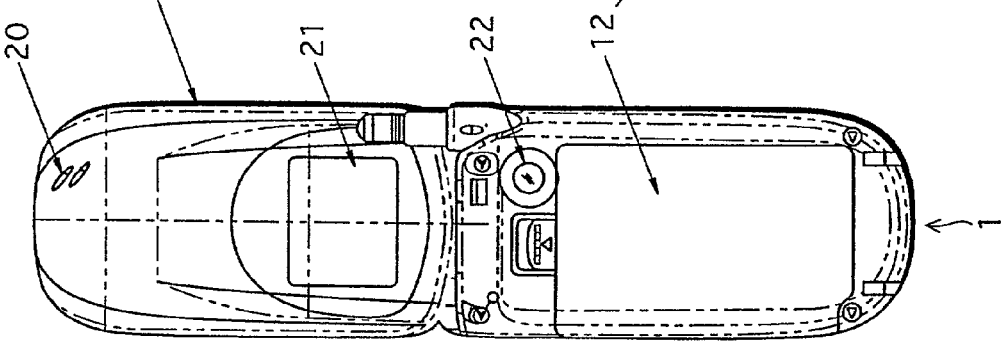

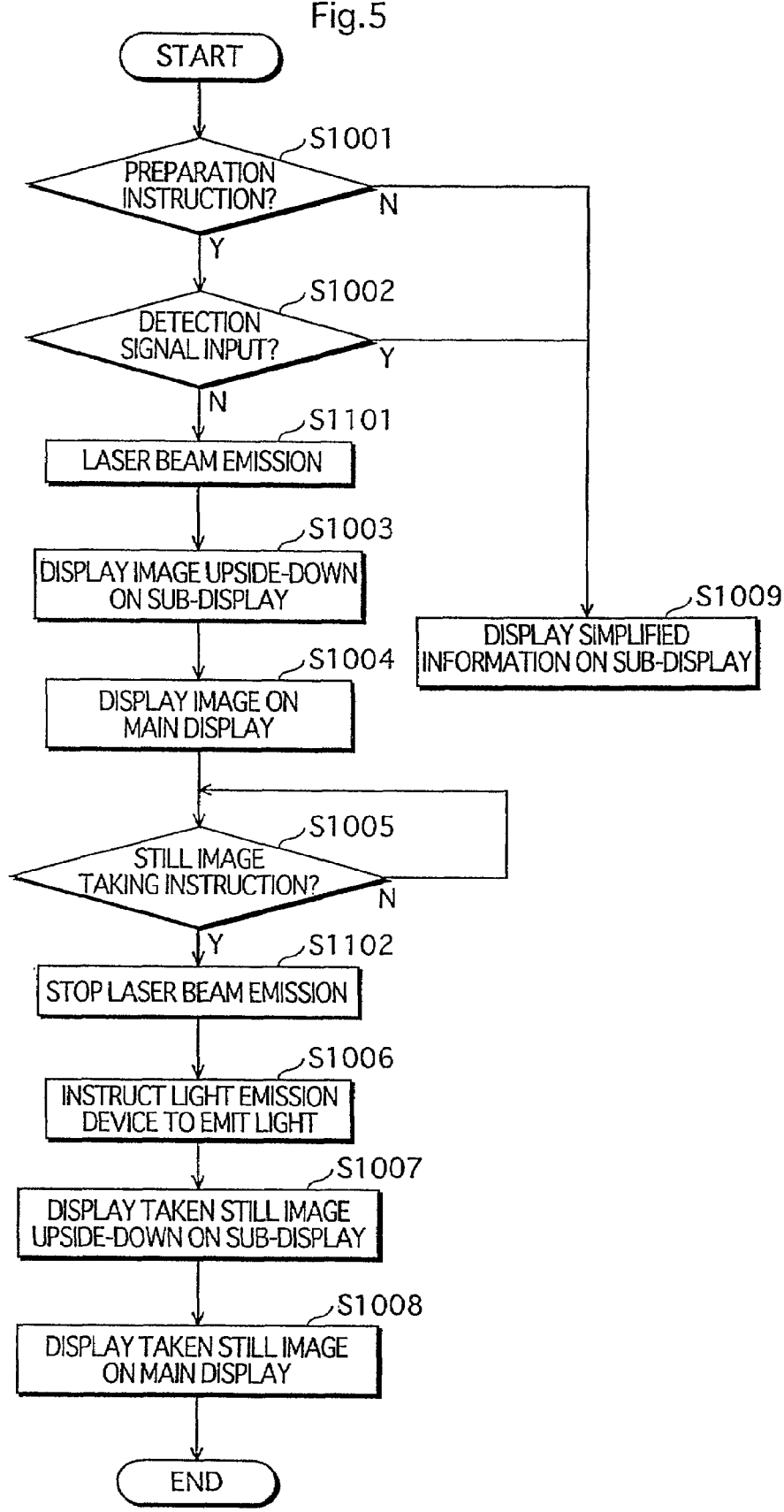

Fig.6A
Fig.6B
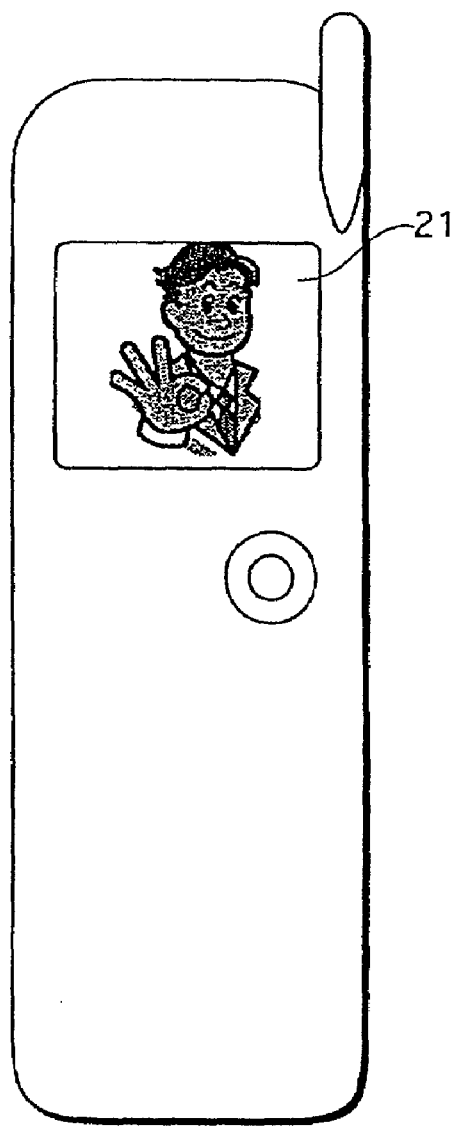
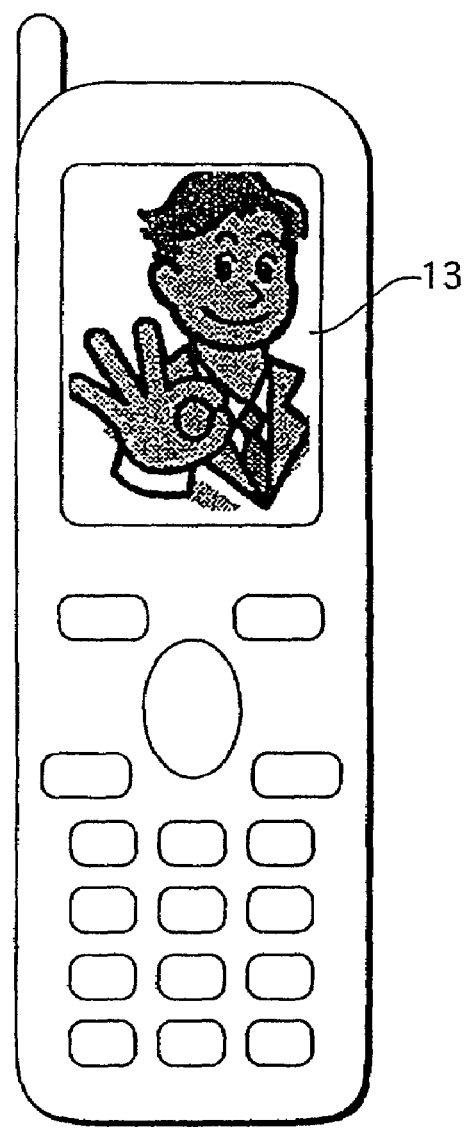

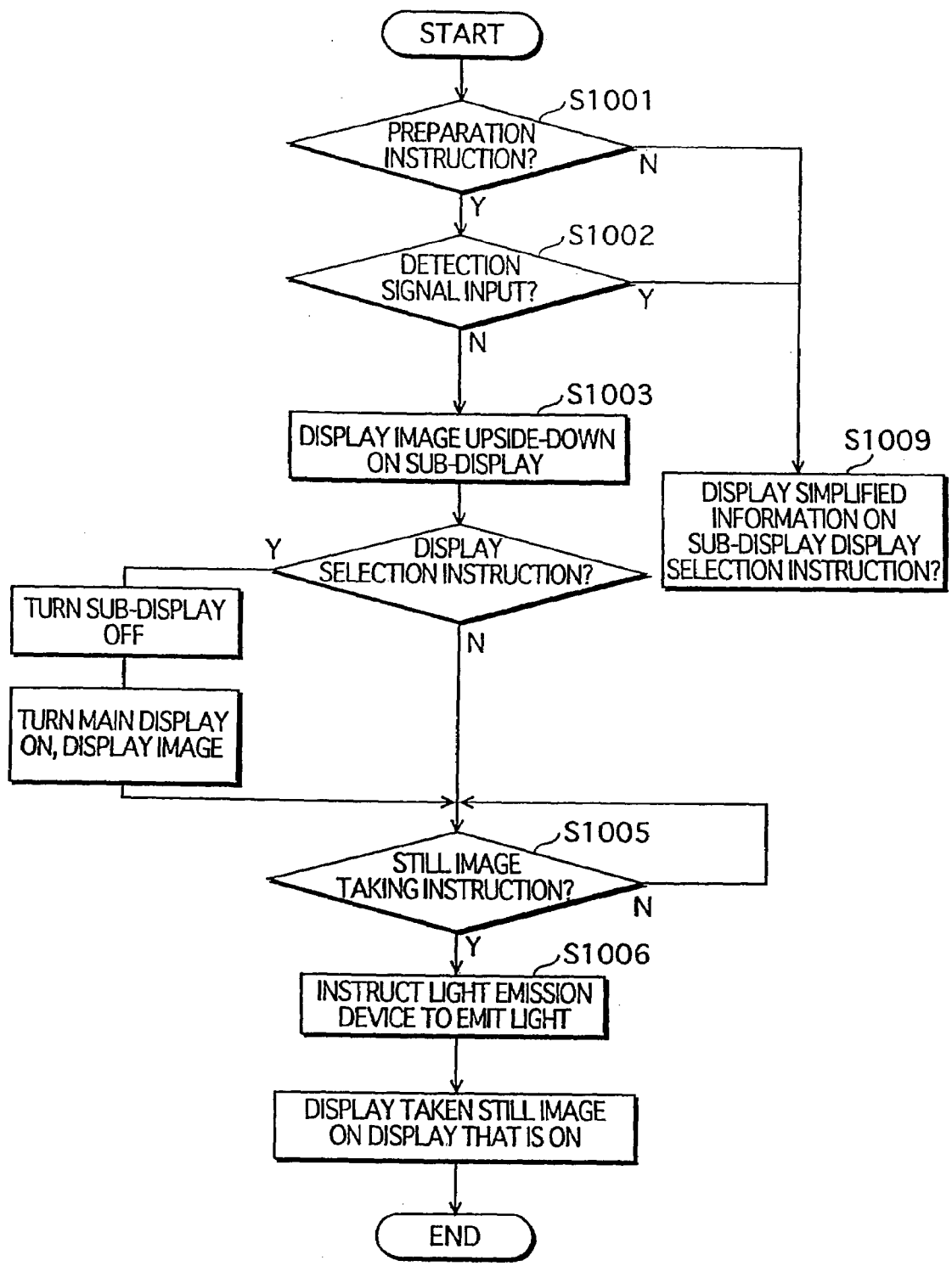

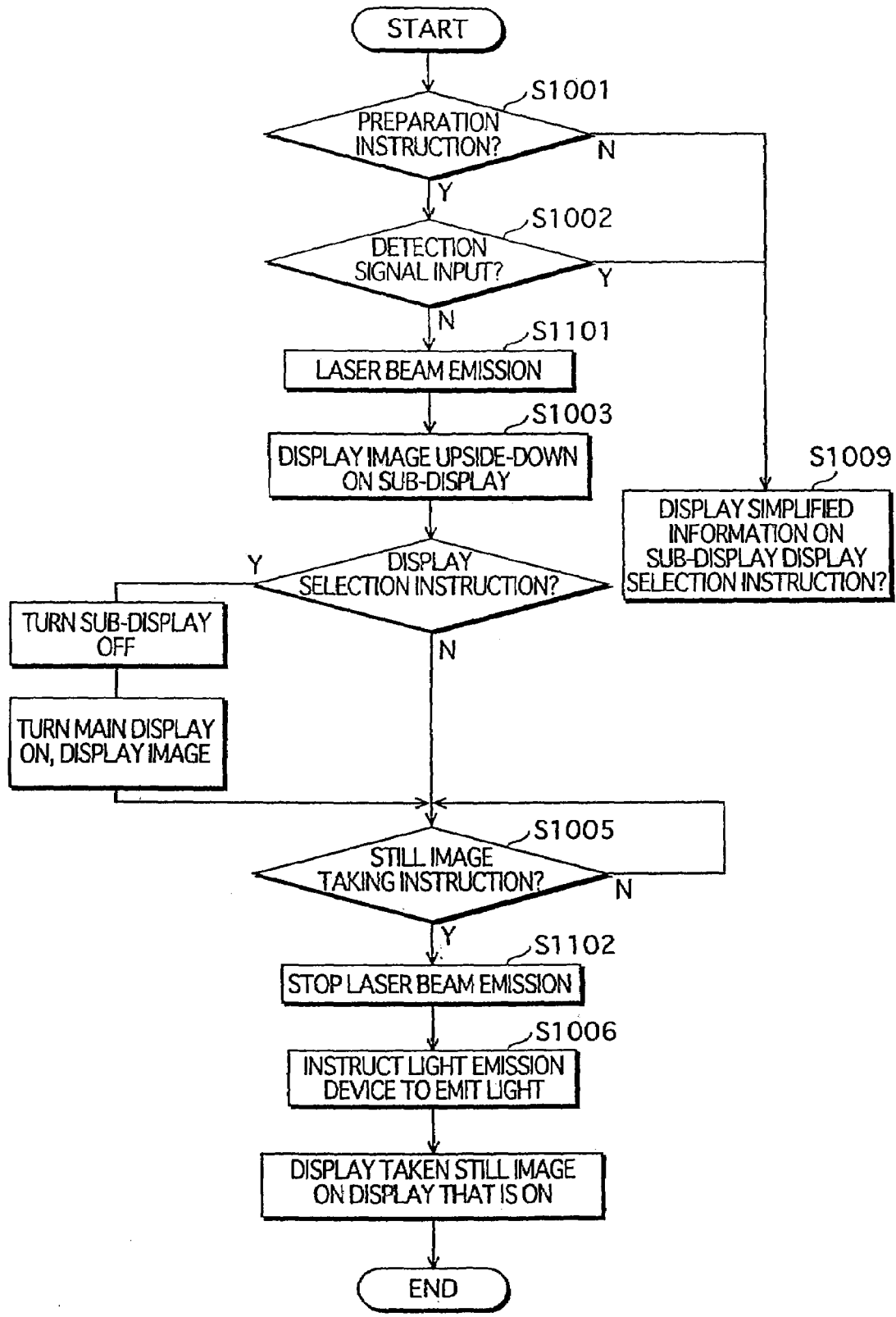

FOLDING MOBILE COMMUNICATION TERMINAL

BACKGROUND OF THE INVENTION (1) Field of the Invention

The present invention relates to a folding mobile communication terminal that has an image-taking function.

(2) Description of the Related Art

In recent years mobile communication devices such as mobile telephones have become increasingly multi-functional, and more recently mobile telephone devices having a CCD (Charge Coupled Device) camera are becoming common. Such cameras use a semiconductor photodetector element that converts light to an electric signal.

In such a portable telephone having a camera, the CCD camera is positioned on the back of the main body of the portable telephone, and an image of the subject taken by the CCD camera is displayed on an LCD screen positioned on the front of the main body. Therefore, the user can confirm through the screen display that the desired subject is in the view of the CCD camera before actually taking an image.

Note that "take an image" is used to denote forming an image of the subject on the photodetecting surface of the semiconductor photodetector through the lens of the camera and converting the formed image into image data.

However, since the LCD that displays the image of the subject taken by the CCD camera is positioned on the front of the main body of the portable telephone and the CCD camera is positioned on the back of the main body, when the user attempts to take an image of him/herself, he/she cannot look at the LCD to check in advance that the subject (i.e., the user) is in a position for an image to be taken as desired. This gives rise to a problem that the user cannot take an image of him/herself as desired.

Such a problem can be solved by making the camera rotatable to face the subject, but this results in an increase in the size of the portable telephone and highs costs because a flexible circuit board must be provided in the rotating unit. This is undesirable in portable telephones since importance is placed on compactness, light weight and low cost.

SUMMARY OF THE INVENTION

In view of the above-described problems, the object of the above-described invention is to provide a portable communication terminal that has a camera that is capable of taking an image of a subject as desired by the user, when the user is the subject of the image and when an image of a subject other than the user is taken.

In order to achieve the stated object, the present invention is a mobile communication terminal, including a camera unit for taking an image of a subject through a camera lens; two displays, the first display being positioned on a same front surface of a body of the mobile communication terminal as the lens so as to be visible in a same view as the lens, and the second display being positioned on a back surface of the body; and a display control unit for having the image taken by the camera unit displayed on at least one of the two displays.

Furthermore, the first display may be fixed on the front surface of the body and the second display may be fixed on the back surface of the body. Furthermore, the mobile communication terminal may be a mobile telephone that includes numeric keys for receiving an input of a telephone number, the numeric keys being on a same surface as one of the first display and the second display.

According to the stated construction, the user can check in advance whether the subject is being displayed in the desired position by looking at the image of the subject displayed on either of the displays, both in cases in which the user takes an image of him/herself as the subject, and in cases when the user takes an image of another subject. Therefore, the user can easily obtain the desired still image of the subject. Furthermore, the user can take an image in a comfortable position without having to look through a viewing lens such as in an ordinary camera.

Here, the mobile communication terminal may have a construction in which the camera unit includes: an emission sub-unit for emitting visible light from a position adjacent to the lens, so as to provide a guide showing a position of the lens, and the display control unit includes: an instruction receiving unit for receiving from a user (a) a preparation instruction for having images of a subject displayed on at least one of the displays successively after each image has been taken, and (b) a still image taking instruction for having a still image of the subject displayed on at least one of the displays, and the display control unit, on reception of the preparation instruction by the instruction receiving unit, has the emission sub-unit emit the visible light, and, on reception of the still image taking instruction by the instruction receiving unit, has the emission sub-unit stop emitting the visible light.

According to the stated construction, the user can estimate the position of the lens and the position of the subject being taken by the lens by using the visible light as a guide when it is dark. As a result, the user can easily adjust him/herself to be in a position taken by the photographic lens, and the process of taking an image can be finished promptly.

Here, the mobile communication terminal may have a construction in which the first display includes: a light emission unit for emitting light, the display control unit includes: an instruction receiving unit for receiving a still image taking instruction for having a still image of a subject displayed on at least one of the displays, directly after the still image has been taken, and the display control unit, on reception of the still image taking instruction by the instruction receiving unit, has the light emission unit emit light.

According to the stated construction, even when taking an image in a dark place, light exposure can be supplemented, and the display also functions as a photographic lamp for the camera. Therefore, the compactness of the mobile communication terminal is used effectively. Here, the mobile communication terminal may have a construction in which the display control unit has the taken image of the subject displayed on only one of the two displays, the display control unit includes: a user instruction reception unit for receiving from a user a display selection instruction for switching over the display displaying the taken image, and the display control unit, on receiving the display selection instruction, turns off the display performing image display, and has the image displayed on the selected display.

According to the stated construction, the display that is not used in taking an image is turned off in response to user instruction. This reduces consumption of the battery.

Here, the mobile communication terminal may further include: a storage unit for storing data of the taken image of the subject; an electronic mail receiving unit for receiving from the user an input of an electronic mail address; and a transmission unit for transmitting the stored image data to a mail server specified by the electronic mail address.

According to the stated construction, the still image that has been taken can be transmitted straight away as e-mail to a mobile communication terminal of a friend, a family member, etc.

Furthermore, the present invention is a foldable mobile communication terminal, including: a housing unit that is composed of a top housing and a bottom housing that are connected via a connection unit that acts as a pivot so that the housing unit is foldable and unfoldable; two displays, the first display being positioned on an outer surface of one of the top housing and the bottom housing and being visible when the housing unit is in a folded state, and the second display being positioned on an inner surface of one of the top housing and the bottom housing and not being visible when the housing unit is in the folded state; a camera unit for taking an image of a subject through a camera lens that is positioned on one of the outer surface and the inner surface of one of the top housing and the bottom housing, so as to be visible in a same view as one of the displays when the housing is in an unfolded state; a judgement unit for judging whether the housing unit is in the unfolded state or the folded state; and a display control unit for having, when the judgement unit judges that the housing unit is in the unfolded state, the taken image of the subject displayed on at least one of the displays directly after the image has been taken.

Here, the first display may be fixed on the outer surface of the housing unit, and the second display may be fixed on the inner surface of the housing unit. Here, the mobile communication terminal may be a foldable mobile telephone that includes numeric keys for receiving an input of a telephone number, the numeric keys being on a same surface as one of the first display and the second display.

According to the stated construction, the mobile communication terminal can be carried in a convenient, folded state, and an image taken as soon as the mobile communication terminal has been put into an unfolded state. Therefore, the mobile communication terminal can be easily carried anywhere, and the user can easily take an image when he/she finds a suitable subject.

Here, the mobile communication terminal may have a construction in which the display control unit further, when the judgement unit judges that the housing unit is in the folded state, has the taken image of the subject displayed on the first display.

According to the stated construction, an image that has been taken can be displayed on the display while the mobile communication terminal is in a folded state, therefore the user can enjoy looking at images in a place where there is little space, such as a crowded train, without bothering others.

Here, the mobile communication terminal may have a construction in which the lens is positioned on a different outer surface of the housing unit to the first display, and the display control unit, when the judgment unit judges that the housing unit is in the unfolded position, has the image displayed on the first display in a direction that is upside-down compared to a direction in which images are displayed when the judgement step judges that the housing unit is in the folded position.

According to the stated construction, if the mobile communication terminal is unfolded in order to take an image, the display direction is put upside-down if the display is upside-down, therefore the display displays the subject taken by the camera in the correct direction. As a result, the user can start taking an image without delay.

Here, the mobile communication terminal may have a construction in which the camera unit includes: an emission sub-unit for emitting visible light from a position adjacent to the lens, and the display control unit includes: an instruction receiving unit for receiving from a user (a) a preparation instruction for having images of a subject displayed on at least one of the displays successively after each image has been taken, and (b) a still image taking instruction for having a still image of the subject displayed on at least one of the displays, and the display control unit, on the instruction receiving unit receiving the preparation instruction, has the emission sub-unit emit the visible light, and, on the instruction receiving unit receiving the still image taking instruction, has the emission sub-unit stop emitting the visible light.

According to the stated construction, the user can estimate the position of the lens and the position of the subject being taken by the lens by using the visible light as a guide when it is dark. As a result, the user can easily adjust him/herself to be in a position taken by the lens, and the process of taking an image can be finished promptly.

Here, the mobile communication terminal may have a construction in which the first display includes: a light emission unit for emitting light, and the display control unit includes: an instruction receiving unit for receiving a still image taking instruction for having a still image of a subject displayed on at least one of the two displays, directly after the still image has been taken.

According to the stated construction, even when taking an image in a dark place, light exposure can be supplemented, and the display also functions as a photographic lamp for the camera. Therefore, the compactness of the mobile communication terminal is used effectively.

Here, the mobile communication terminal may have a construction in which the display control unit has, when the judgement unit judges that the housing unit is in the unfolded state, the taken image of the displayed on one of the displays, the display control unit further includes: a user instruction receiving unit for receiving a display selection instruction for switching over the display to perform image display, and the display control unit, on the user instruction receiving unit receiving the display selection instruction, has the display performing image display turned off and the image displayed on the selected display.

According to the stated construction, the display that is not used in taking an image is turned off in response to user instruction. This reduces consumption of the battery.

Furthermore, the present invention is a foldable mobile communication terminal, including: a housing unit that is composed of a top housing and a bottom housing that are connected via a connection unit that acts as a pivot so that the housing unit is foldable and unfoldable; two displays; a camera unit for taking an image of a subject through a camera lens that is positioned on an outer surface of a same of the top housing and the bottom housing as the first display, so as to be visible in a same view as the first display when the housing is in an unfolded state, an instruction receiving unit for, when the housing is in the folded state, receiving from a user (a) a preparation instruction for having images of a subject displayed on at least one of the displays successively after each image has been taken, and (b) a still image taking instruction for having a still image of the subject displayed on at least one of the displays, and a display control unit for having images displayed successively on the first display, on the instruction receiving unit receiving the preparation instruction, and having the still image displayed on the first display, on the instruction receiving unit receiving the still image taking instruction.

Here, the first display may be fixed on the outer surface of the housing unit, and the second display may be fixed on the inner surface of the housing unit. Here, the mobile communication terminal may be a foldable mobile telephone that includes numeric keys for receiving an input of a telephone number, the numeric keys being on a same surface as one of the first display and the second display.

According to the stated construction, an image can be taken with the mobile communication terminal in the folded state, therefore the user can take an image straight away on finding a suitable subject.

Furthermore, the present invention is a display control method for a foldable mobile communication terminal that includes (a) a top housing and a bottom housing that are connected via a connection unit that acts as a pivot so that the housing unit is foldable and unfoldable, (b) two displays, the first display being positioned on an outer surface of one of the top housing and the bottom housing and being visible when the housing unit is in a folded state, and the second display being positioned on an inner surface of one of the top housing and the bottom housing and not being visible when the housing unit is in the folded state, and (c) a camera unit for taking an image of a subject through a camera lens that is positioned on one of the outer surface and the inner surface of one of the top housing and the bottom housing, so as to be visible in a same view as one of the displays when the housing is in an unfolded state, the display control method including: a judgement step for judging whether the housing is in the unfolded state or in the folded state; and a display control step, when the judgement step judges that the housing unit is in the unfolded state, for having the taken image displayed on at least one of the two displays. Here, the first display may be fixed on the front surface of the housing and the second display may be fixed-on the back surface of the housing, and the mobile information terminal may be a mobile telephone that includes a numeric key pad for inputting a telephone number, the numeric key pad being on a same surface as one of the first display and the second display.

According to the stated construction, the mobile communication terminal can be carried in a convenient, folded state, and an image taken as soon as the mobile communication terminal has been put into an unfolded state. Therefore, the mobile communication terminal can be easily carried anywhere, and the user can easily take an image when he/she finds a suitable subject.

Here, the lens may be positioned on a different outer surface of the housing to the first display, and the display control step may, when the judgment step judges that the housing is in the unfolded position, have the image displayed on the first display in a direction that is upside-down compared to a direction in which images are displayed when the judgement step judges that the housing unit is in the folded position.

According to the stated construction, if the mobile communication terminal is unfolded in order to take an image, the display direction is put upside-down if the display is upside-down, therefore the display displays the subject taken by the camera in the correct direction. As a result, the user can start taking an image without delay.

Here, the camera unit may include an emission sub-unit for emitting visible light from a position adjacent to the lens, and the display control step may include: an instruction receiving sub-step for receiving from a user (a) a preparation instruction for having images of a subject displayed on at least one of the displays successively after each image has been taken, and (b) a still image taking instruction for having a still image of the subject displayed on at least one of the displays, and the display control step may, on reception of the preparation instruction, has the emission unit emit the visible light, and, on reception of the still image taking instruction, has the emission unit stop emitting the visible light.

According to the stated construction, the user can estimate the position of the lens and the position of the subject being taken by the lens by using the visible light as a guide when it is dark. As a result, the user can easily adjust him/herself to be in a position taken by the photographic lens, and the process of taking an image can be finished promptly.

Here, the first display may have a light emission unit for emitting light, and the display control step may include: an instruction receiving sub-step for receiving a still image taking instruction for having a still image of a subject displayed on at least one of the two displays, directly after the still image has been taken, and the display control step may, on the instruction receiving sub-step receiving the still image taking instruction, have the light emission unit emit light.

According to the stated construction, even when taking an image in a dark place, light exposure can be supplemented, and the display also functions as a photographic lamp for the camera. Therefore, the compactness of the mobile communication terminal is used effectively.

Here, the display control step may, when the judgement step judges that the housing is in the unfolded state, have an image displayed on one of the displays directly after the image has been taken.

According to the stated construction, the display that is not used in taking an image is turned off in response to user instruction. This reduces consumption of the battery.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIGS. 1A to 1C show outer views of a folding mobile communication terminal 1 of the present embodiment in an unfolded state, FIG. 1A showing a front view, FIG. 1B showing a right side view, and FIG. 1C showing a back view;

FIG. 5 is a flowchart showing a process performed by the control unit 10 for controlling display of an image of a subject taken by the camera unit 22, when a laser emitting device is used in the camera unit 22;

FIGS. 6A and 6B show outer views of a non-folding mobile communication terminal, FIG. 6A showing a positioning example of the sub-display 21 and the camera unit 22 on the back, and FIG. 6B showing an outer view of the front;

FIG. 7 is a flowchart showing a process performed by the control unit 10 for controlling display of an image taken by the camera unit 22 of a subject, when a display selection key is provided in an operation unit 14;

FIG. 8 is a flowchart showing a process performed by the control unit 10 controlling display of an image taken by the camera unit 22 of a subject, when the camera unit 22 in FIG. 7 further includes a laser emitting device;

DESCRIPTION OF THE PREFERRED EMBODIMENTS

Figure 2:
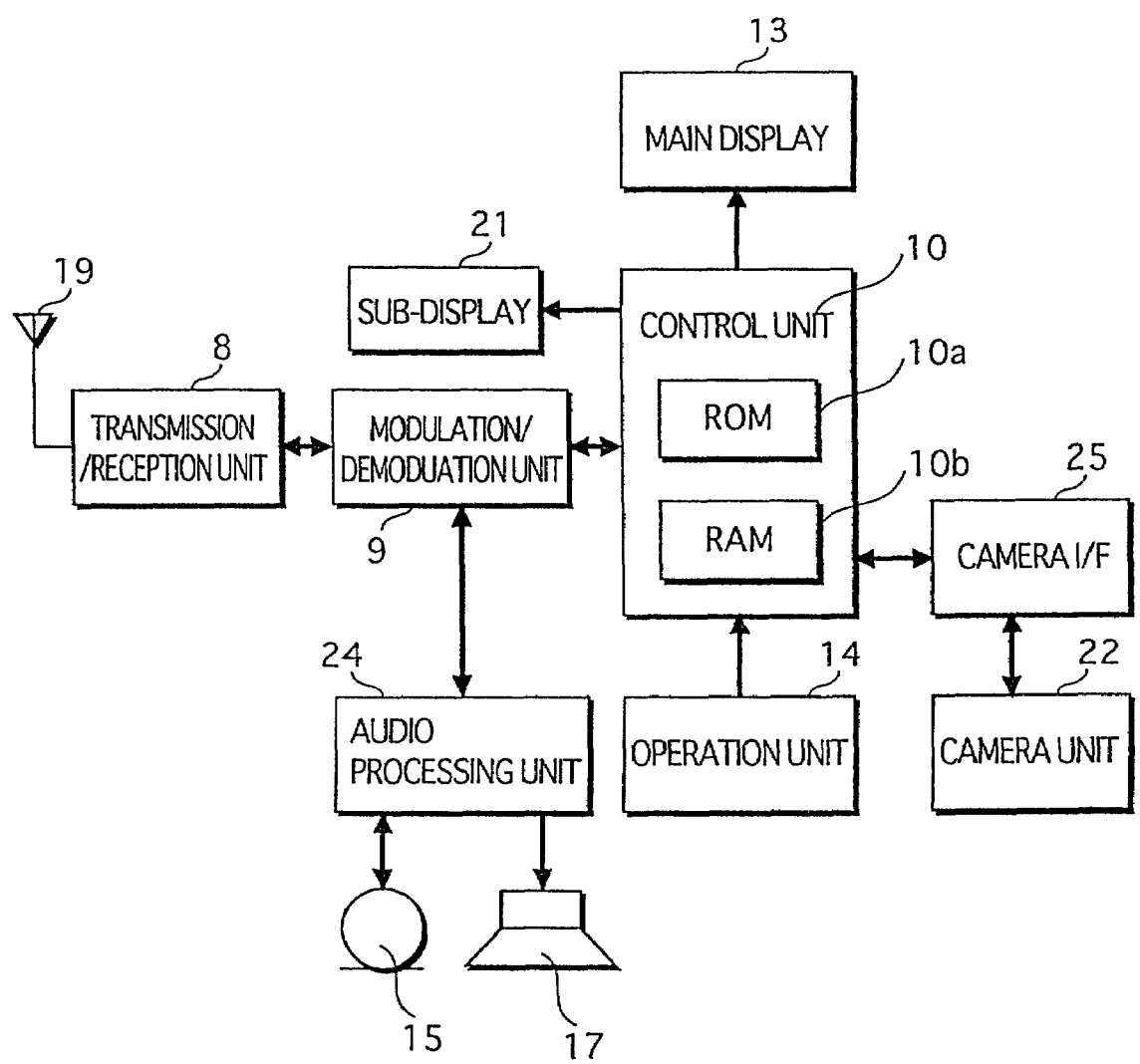
FIG. 2 is a function block drawing showing the structure of the folding mobile communication terminal 1.

The following describes a portable communication terminal of the present invention in detail with reference to the drawings.

FIGS. 1A to 1C show outer views of a folding mobile communication terminal 1 (hereinafter "communication terminal 1") of the present embodiment in an unfolded state. Specifically, FIG. 1A shows a front view, FIG. 1B shows a right side view, and FIG. 1C shows a back view.

The communication terminal 1 includes housing 11, housing 12, a main display 13, an operation unit 14, a microphone 15, a detection unit 16, a receiver 17, an earphone terminal 18, an antenna 19, a speaker 20, a sub-display 21, and a camera unit 22.

For convenience, here the housing 11, the housing 12, the detection unit 16, a side key 14i included in the operation unit 14, and the earphone terminal 18 are described below, while other components are described later.

The housing 11 and 12 are connected by a central hinge unit 23 to form foldable housing. The main display 13 and the receiver 17 are positioned on the inner surface of the housing 11 (the surface shown in FIG. 1A), while the speaker 20 and the sub-display 21 are provided on the outer surface (the surface shown in FIG. 1C).

The operation unit 14 and the microphone 15 are provided on the inner surface of the housing 12 (the surface shown in FIG. 1A), while the side key 14i that functions as a shutter button for taking an image with the camera unit 22 is positioned on the side.

The side key 14i is used when taking an image with the camera unit 22, and is structured to have two states: a state in which the key is partially pressed down (hereinafter "half-pressed state") and a state in which the key is fully pressed down (hereinafter "fully-pressed state"). In the half-pressed state the control unit 10 (FIG. 2) is given a preparation instruction, and in the fully-pressed state the control unit 10 is given a still image taking instruction.

A further function of the side key 14i is instructing the control unit 10 to read data of an image data that has been taken and display the image data on the sub-display 21, when the detection unit 16 detects that the communication terminal 1 is in a folded state and if the fully-pressed state is maintained for at least a predetermined length of time (for example, three seconds).

Here, "preparation instruction" denotes an instruction to have the camera unit 22 start taking images of the subject, and have the data of each image displayed successively on the main display 13 or the sub-display 21 directly after each image is taken.

Here, "still image taking instruction" denotes an instruction for having image data displayed on the main display 13 or the sub-display 21 as a still image directly after an image has been taken.

The detection unit 16 detects mechanically whether the communication terminal 1 is in an unfolded state (including a partially unfolded state) or in a folded state. For example, a protruding unit is provided on the housing 11 (FIG. 1A, 16a), and the detection unit 16 detects mechanically whether the communication terminal 1 is in a folded state according to whether the protruding unit is applying pressure to the detection unit 16. When the detection unit 16 detects that pressure is being applied by the protruding unit, it outputs a detection signal to the control unit 10.

It is also possible to detect whether the communication terminal 1 is folded or unfolded by use of other conventional techniques such as an optical sensor detecting that the communication terminal 1 is in an unfolded state, or by an encoder detecting the angle at which the communication terminal 1 is unfolded.

The earphone terminal 10 is a terminal for connecting an earphone microphone.

FIG. 2 is a function block drawing showing the structure of the communication terminal 1. As FIG. 2 shows, the communication terminal 1 is composed of an antenna 19, a transmission/reception unit 8, a modulation/demodulation unit 9, a control unit 10, a main display 13, a sub-display 21, a camera unit 22, a camera I/F (interface) 25, an operation unit 14, an audio processing unit 24, a microphone 15, and a receiver 17.

The antenna 19 receives and transmits communication waves.

The transmission reception unit 8 performs transmission and reception of communication data as communication waves. Here, "communication data" denotes call audio data, electronic mail data, character information, image data, control data used for communication control, and so on.

The modulation/demodulation unit 9 modulates communication data for transmission, and also demodulates communication data for reception which it then outputs to the audio processing unit 24.

The control unit 10 includes, for example, a microprocessor, a ROM (Read Only Memory) 10a, and a RAM (Random Access Memory) 10b, and performs various types of control, according to control programs stored in the ROM 10a, such as display control of images taken by the camera unit 22. The control unit 10 follows the programs stored in the ROM 10a to control images taken by the camera unit 22, and controls display of images based on instructions from the user via the side key 14i regarding taking images, (preparation instructions, still image taking instructions), and detection signals from the detection unit 16.

Note that details of the display control performed by the control unit 10 are described later.

The ROM 10a stores the control programs. The RAM 10b temporarily stores data to be transmitted, data that has been received, data of images that have been taken, and other data such as telephone directory data.

The main display 13 is composed of a color LCD device, a DMD (digital mirror device), an organic EL (electro luminescence) display device, a PDP (plasma display panel), or a similar device. The main display 13 displays images taken by the camera unit 22 (moving images or intermittent images displayed in substantially real time after a preparation instruction and before a still image taking instruction, a still image that has been taken after a still image taking instruction), information to be notified such as incoming-communication history, character information such as e-mail and telephone directory data, the present time, etc. Note that when a detection signal showing that the communication terminal 1 has been put into a folded state is received by the control unit 10, the control unit 10 has the main display 13 turned off, or has a back light (not illustrated) in the main display turned off.

The sub-display 21 is composed of a color LCD device, a DMD, an organic EL display device, a PDP, or a similar device. When the detection unit 16 outputs a detection signal showing that the communication terminal 1 is in a folded state, the sub-display 21 displays information that does not relate to taking images (hereinafter "non-image-taking information") such as a stand-by display, information to be notified to the user such as incoming-communication history, the present time, image data that has been stored in the RAM 10b, and so on. When the detection unit 16 is not outputting a detection signal, i.e., when the communication terminal 1 is in an unfolded state, the sub-display 21 displays images taken by the camera unit 22 (moving images or intermittent images displayed in substantially real time after a preparation instruction and before a still image taking instruction, a still image that has been taken after a still image taking instruction). Here, the sub-display 21 displays these images in the opposite direction (hereinafter referred to as "upside-down") to the non-image taking information.

Furthermore, the sub-display 21 also has a light emission device such as a stroboscope to supplement light if exposure is insufficient when taking an image in a dark place. The light emission device emits light by the control unit 10 in response to a light emission instruction on detection of a still image taking instruction.

Furthermore, the sub-display 21 further includes a lamp that flashes when the communication terminal 1 receives incoming-communication, and is red when the batteries are being recharged. It also includes a back light that lights up the sub-display 21.

The camera unit 22 is connected to the control unit 10 via a flexible cable and a camera I/F, and has a built-in camera. An image is formed on photodetecting surfaces of semiconductor photodetector elements via the camera lens. The camera lens is positioned on the housing 12 as shown by 22 in FIG. 1C. The image is converted to an electric signal corresponding to the intensity of the incident light received at each photodetector. Then the electric signals are further A/D converted, and output as image data via the camera I/F 25 to the RAM 10b. A CCD camera, a CMOS (Complementary Metal Oxide Semiconductor) camera, or the like is used for the internal camera.

The camera unit 22 may have a laser emitting device for emitting a laser beam via a small hole provided on the surface of the housing 12 adjacent to the lens of the internal camera (for example, immediately above or immediately below the lens). In this case, the laser emitting device emits a red laser beam from the small hole on receiving a laser beam emission instruction from the camera I/F 25, and stops emitting the laser beam on receiving an emission stop instruction from the camera I/F 25. This laser emitting device acts as a guide for the user to estimate the position of the lens and the position of the subject being taken through the lens when taking an image in a dark place. As a result the user can easily adjust his/her position in relation to the position of the lens when taking an image of him/herself. As a result, the process of taking an image can be completed promptly. Note that a colored-light device that emits colored light may be used instead of a laser emitting device. The camera I/F 25 outputs various types of control instructions to the camera unit 22, in response to instructions from the control unit 10. Specifically, on receiving a preparation instruction from the control unit 10, the camera I/F unit 25 instructs the camera unit 22 to take images of a subject and to successively output the image data of each image that has been taken, and then on receiving a still image taking instruction, instructs the camera unit 22 to take a still image and to output data of the still image. Furthermore, the camera I/F 25 reads the image data output from the camera unit 22, and outputs the read image data to the RAM 10b.

Note that the if the camera unit 22 has a laser emission device, the camera I/F 25, in addition to the aforementioned instructions, instructs laser beam emission on receiving a preparation instruction from the control unit 10. Then, on receiving a still image taking instruction, the camera I/F 25 instructs the camera unit 22 to take a still image and to output data of the still image.

The operation unit 14 has various function keys for receiving instructions from the user. For example, in the example in FIG. 1A, the operation unit 14 is composed of a flexible key 14a, a four-point key 14b, an e-mail key 14c, an OK key 14d, and end key 14e, numeric keys 14f, a web key 14g, a start key 14h, and the side key 14i.

Note that the functions and positioning of the function keys in FIG. 1A are shown as an example, and are not limited to this example.

The function of the flexible key 14a is designated according to the content of the screen displayed of the main display 13. For example, the flexible key 14a functions as a function key for having a menu selection screen displayed when the stand-by screen is being displayed, and functions as a function selection key for the user to select a desired menu when a menu selection screen is being displayed.

The four-point key 14b is a key for moving the cursor up, down, left and right. Depending on the screen being displayed on the main display 13, the four-point key 14b functions as a key for setting the volume, for reading out a telephone number, and as a key for converting characters of the Japanese alphabet into Chinese characters.

The e-mail key 14c is for having an e-mail screen displayed.

The OK key 14d is for confirming a selection selected using the flexible key 14a from a menu.

The end key 14e is for turning the power on and off, and for ending a telephone call.

The numeric keys 14f are for inputting telephone numbers, characters, etc.

The web key 14g is for having a screen that displays an Internet connection function displayed.

The start key 14h is for starting call initiation or call reception.

Note the above-described keys may be push-button keys, a touch panel, or a dial.

The audio processing unit 24 D/A converts communication data that has been output by the modulation/demodulation unit 9, and outputs the converted data as an audio signal to the receiver 17. The audio processing unit 24 also converts audio input from the microphone 15 to an audio signal, and outputs the audio signal to the modulation/demodulation unit 9.

The microphone 15 outputs input audio to the audio processing unit 24.

The receiver 17 reproduces audio from an audio signal output by the audio processing unit 24.

Figure 3:
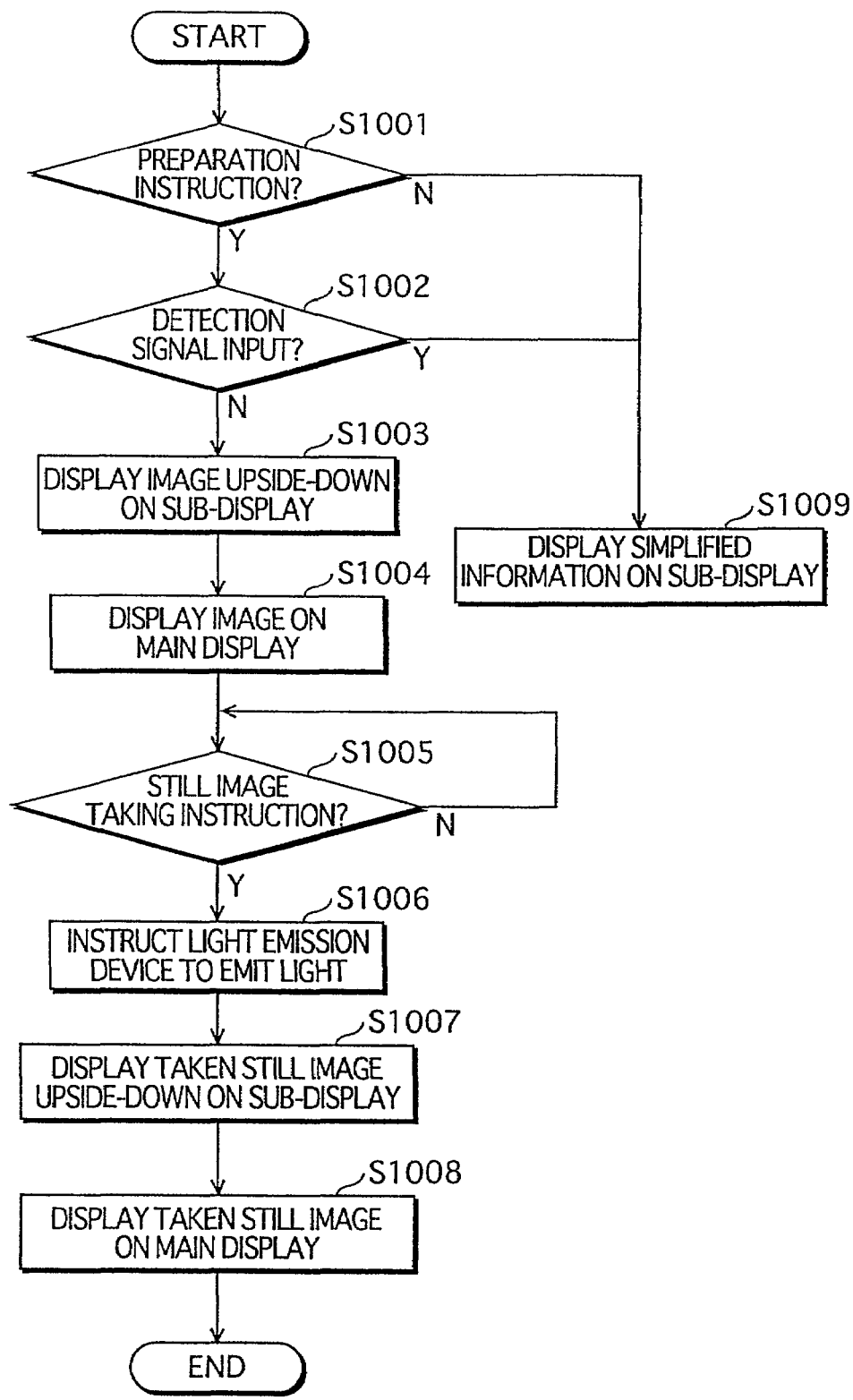
FIG. 3 is a flowchart showing a process performed by a control unit 10 for controlling display of an image of the subject taken by a camera unit 22.

The following describes control processing performed by the control unit 10 for displaying images taken by the camera unit 22. FIG. 3 is a flowchart showing the above-described processing.

The control unit 10 judges whether a preparation instruction has been input by the user, by detecting whether an operation-signal is being generated by the side key 14i being partially pressed (step S1001), and when an operation signal has been generated (step S1001:Y), the control unit 10 judges whether the communication terminal 1 is in an unfolded state by judging whether a detection signal is being input from the detection unit 16 (step S1002).

When a detection signal is not being input (step S1002: N), the control unit 10 judges that the communication terminal 1 is in an unfolded state, instructs the camera unit 22 to output image data of the subject via the camera I/F 25, and has the image data, which is successively output, displayed upside-down on the sub-display 21 in substantially real time (step S1003). Furthermore, the control unit 10 also has the image data displayed on the main display 13 (not upside-down) (step S1004), and then judges whether a still image taking instruction has been input by the user, by whether an operation signal has been generated according to the side key 14i is being fully pressed down (step S1005).

When a still image taking instruction has been input (step S1005: Y), the control unit 10 instructs light emission by the light emission device of the sub-display 12 (step S1006). Furthermore, the control unit 10 instructs, via the camera I/F 25, the camera unit 22 to take a still image of the subject and to output data of the still image, and has the still image data displayed upside-down on the sub-display 21 (step S1007). Furthermore, the control unit 10 has the still image data displayed on the main display (not upside down) (step S1008).

Furthermore, at step S1001, when a preparation instruction has not been input (step S1001:N), or at step S1002 when a detection signal is not detected (step S1002:Y), the control unit 10 displays non-image-taking information on the sub-display 21 (step S1009).

Figure 4A:
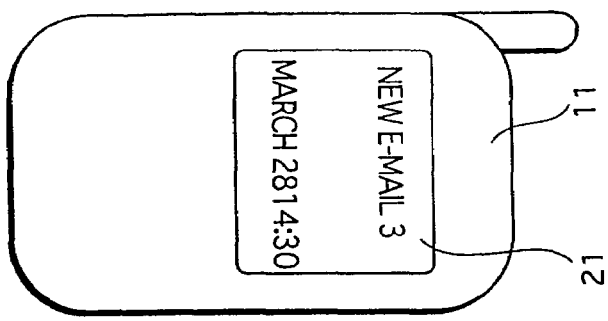
FIGS. 4A to 4C show image display examples displayed on a sub-display 21 and a main display 13 of the folding mobile communication terminal 1 before and after preparation for taking an image, FIG. 4A showing a display example before preparation of non-image-taking information, FIG. 4B showing an example after preparation of an image that has been taken being displayed upside-down on the sub-display 21, and FIG. 4C being a display example after the image has been taken of the image being displayed on the main display 13.
Figure 4B:
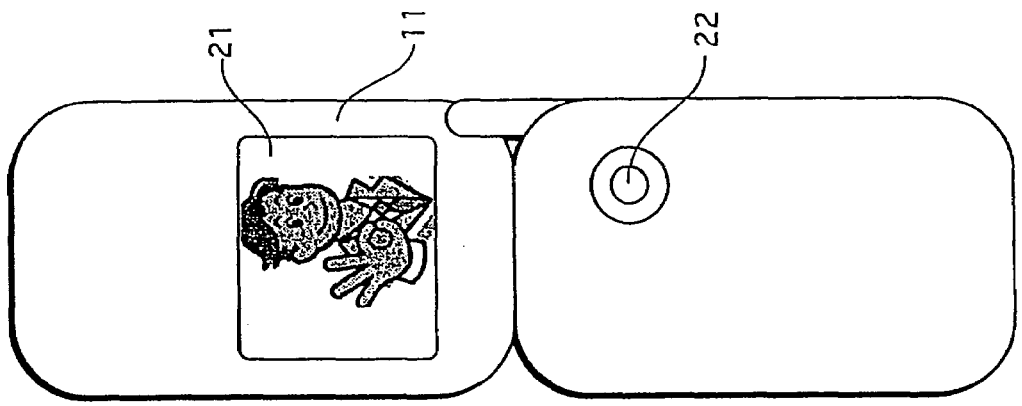
Figure 4C:
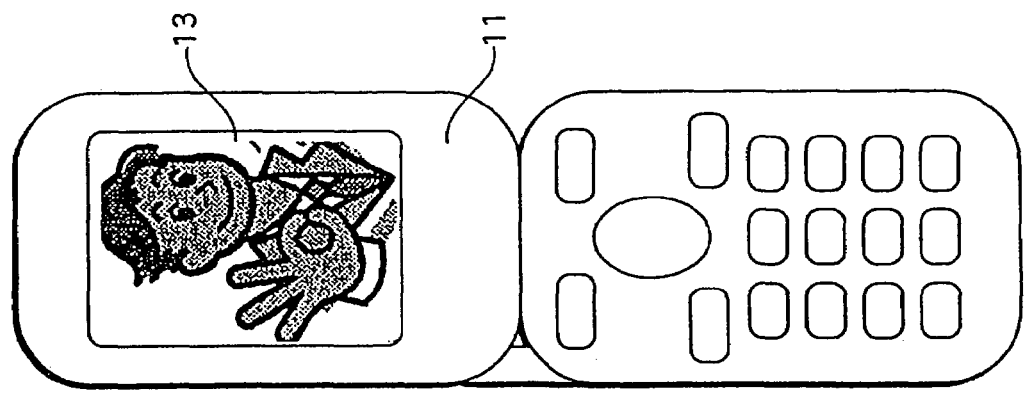

FIGS. 4A to 4C show examples of images displayed on the sub-display 21 and the main display 13 of the communication terminal 1 before and after preparation for taking an image. FIG. 4A shows an example of display information on the sub-display 21 when an image is not being taken before preparation for photography, FIG. 4B shows an example after a preparation instruction has been input of image data being displayed upside-down on the sub-display 21 directly after being taken, and FIG. 4C is a display example after an image has been taken of the image being displayed on the main display 13.

The following describes control processing performed by the control unit 10 for displaying an image taken by the camera unit 22, when the camera unit 22 has a laser emitting device.

FIG. 5 is a flowchart showing the above-described processing. Steps in the flowchart in FIG. 5 that are the same as those in FIG. 3 have the same numbering, and a description thereof is omitted. The following describes the processing shown in the flowchart in FIG. 5 that differs from the processing the flowchart in FIG. 3.

After the processing at step S1001, when a detection signal is not being input at step S1002 (step S1002:N), the control unit 10 instructs the camera unit 22 via the camera I/F 25 to emit a laser beam (step S1101). The control unit 10 performs the processing from steps S1003 to S1004, and at step S1005, on reception of a still image taking instruction (step S1005:Y), instructs the camera unit 22, via the camera I/F 25, to stop emission of the laser beam (step S1102). Then the control unit 10 performs the processing from steps S1006 to S1008.

This completes the description of the embodiment of the present invention, however the present invention is not limited to the above-described embodiment.

For example, the mobile communication terminal of the embodiment of the present invention is described as, but not limited to being, a folding communication terminal. FIG. 6A shows an example of the placement of the sub-display 21 and the camera unit 22 on the back of a non-folding mobile communication terminal. FIG. 6B shows an outer view of the front of such a mobile communication terminal. In this case, step S1002 in the flowcharts in FIGS. 3 and 5 is unnecessary, and the display in step S1003 is performed in the same direction as display of non-image-taking information.

Furthermore, in the embodiment of the present invention, the camera unit 22 is positioned on the back of the housing 12, but the camera 12 may positioned on the front of the housing 12, or on the front of the housing 11.

Furthermore, in the embodiment of the present invention, as shown in the flowcharts in FIGS. 3 and 5, data of an image is shown displayed on both the main display 13 and the sub-display 21 directly after being taken, but the image data may be displayed one of the displays, and the other display turned off. Here, a display selection key may be provided in the operation unit 14 (for example, the flexible key 14a), and the user may select the desired display using this key. Flowcharts in FIGS. 7 and 8 show display control processing performed in such a case by the control unit 10 that corresponds to the flowcharts in FIGS. 3 and 5.

Figure 9:
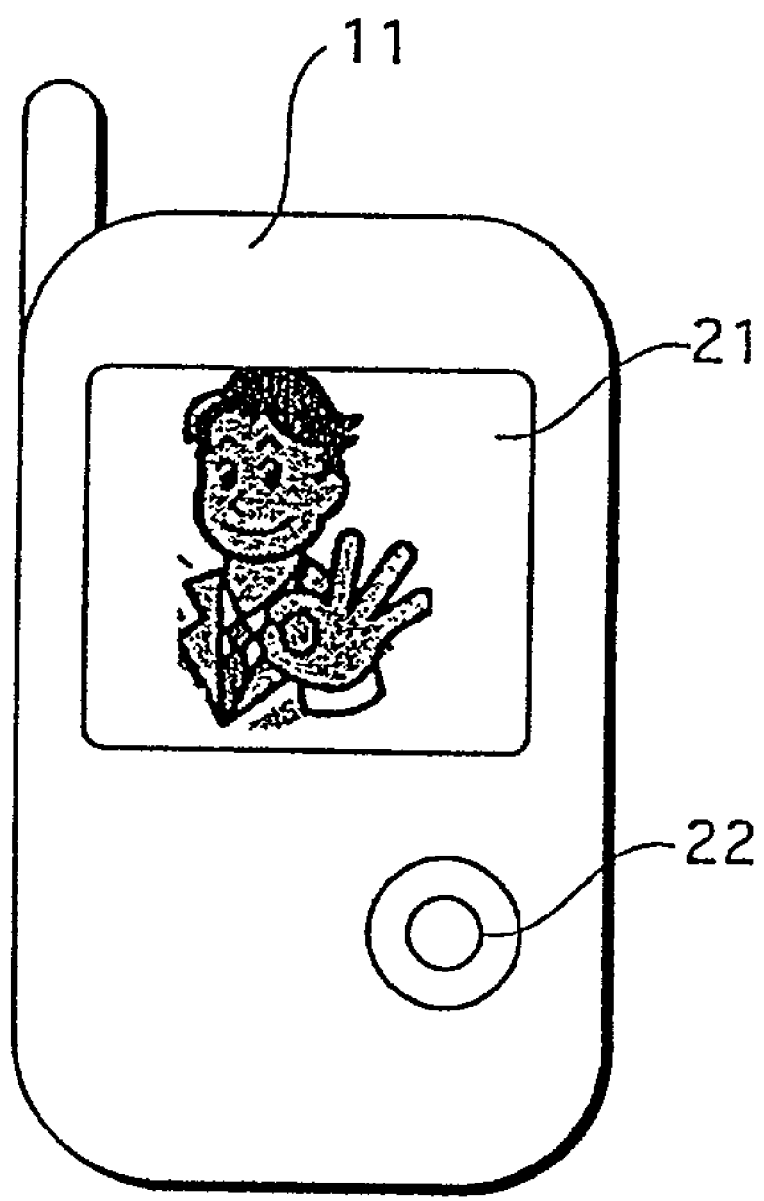
FIG. 9 is an outer view of an example of the appearance of the folding mobile communication terminal 1 when both the sub-display 21 and the camera 22 are provided on the same housing.
Figure 10:
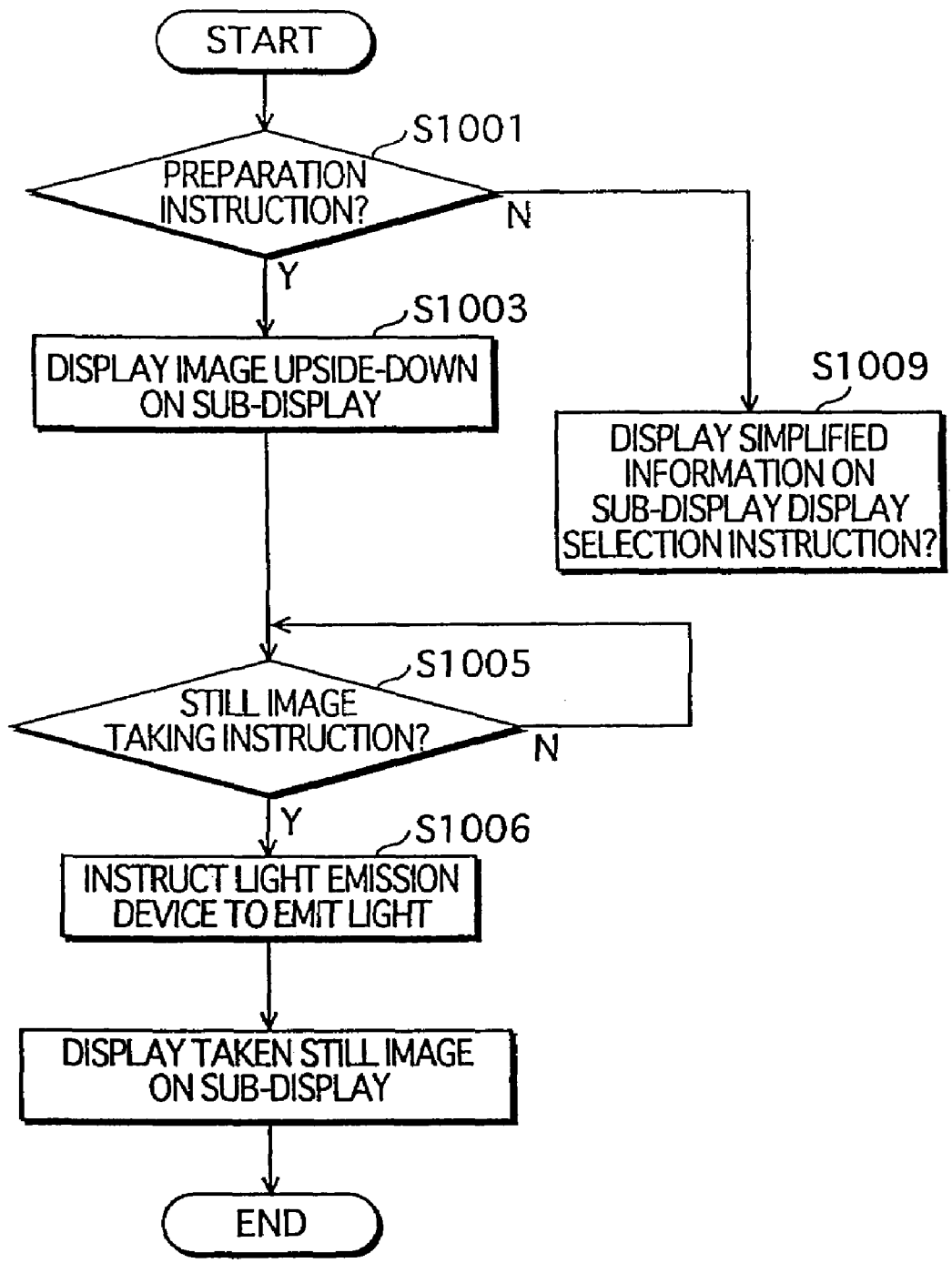
FIG. 10 is a flowchart showing a process performed by the control unit 10 for controlling display of an image taken by the camera unit 22 of a subject, when the sub-display 21 and a lens of the camera 22 are both positioned on an outer surface of either housing 11 or housing 12.
Figure 11:
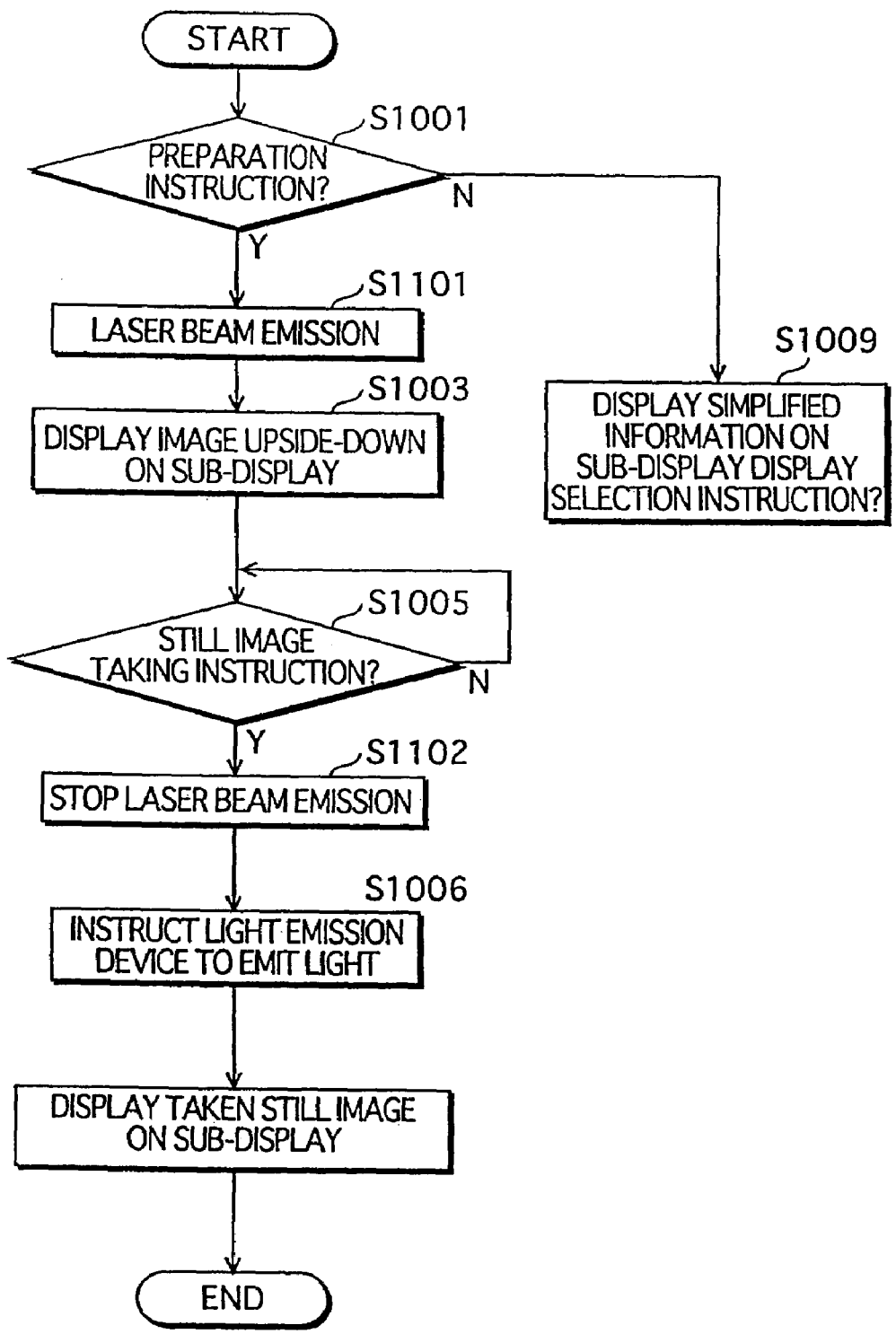
FIG. 11 is a flowchart of showing a process performed by the control unit 10 controlling display of an image taken by the camera unit 22 of a subject, when the camera unit 22 in FIG. 10 further includes a laser emitting device.

Furthermore, in the embodiment of the present invention, as shown in FIG. 1C, the sub-display 21 and the lens of the camera unit 22 are positioned on the outer surfaces of the housing 11 and housing 12 respectively, but both may be positioned on either the housing 11 or the housing 12, and in response to preparation instructions and still image taking instructions from the user, an image may be taken with the housing in a folded state, and the resulting image displayed on the sub-display 21 in the same direction as non-image-taking information. FIG. 9 shows an example of an outer view of the communication terminal 1 when both the sub-display 21 and the camera unit 22 are positioned on the same housing. Flowcharts in FIGS. 10 and 11 show display control processing performed in such a case by the control unit 10 that corresponds to the flowcharts in FIGS. 3 and 5.

What is claimed is:

1. A mobile communication terminal comprising:
a camera unit for taking an image of a subject through a camera lens;
two displays, a first display being positioned on a same front surface of body of the mobile communication terminal as the camera lens so as to be visible in a same view as the camera lens, and a second display being positioned on a back surface of the body;

display control means for having the image taken by the camera unit displayed on at least one of the two displays;

wherein the first display is fixed on the same front surface of the body and the second display is fixed on the back surface of the body, the mobile communication terminal is a mobile telephone that includes numeric keys for receiving an input of a telephone number, the numeric keys being on a same surface as one of the first display and the second display, the display control means has the taken image of the subject displayed on only one of the two displays, the display control means includes:

a user instrutction reception unit for receiving from a user a display selection instruction for switching over the display displaying the taken image, and the display control means, on receiving the display selection instruction, turns off the display performing image display, and has the image displayed on the selected display.

2. The mobile communication terminal of claim 1, wherein the camera unit includes;

an emission sub-unit for emitting visible light from a position adjacent to the camera lens, so as to provide a guide showing a position of the camera lens, and the display control means includes:

an instruction receiving unit for receiving from a user (a) a preparation instruction for having images of a subject displayed on at least one of the displays successively after each image has been taken, and (b) a still image taking instruction for having a still image of the subject displayed on at least one of the displays, and the display control means, on reception of the preparation instruction by the instruction receiving unit, has the emission sub-unit emit the visible light, and, on reception of the still image taking instruction by the instruction receiving unit, has the emission sub-unit stop emitting the visible light.

3. The mobile communication terminal of claim 1, further comprising:

storage means for storing data of the taken image of the subject;

electronic mail receiving means for receiving from the user an input of an electronic mail address; and transmission means for transmitting the stored image data to a mail server specified by the electronic mail address.

4. A foldable mobile communication terminal, comprising:

a housing unit that is composed of a top housing and a bottom housing that are connected via a connection unit that acts as a pivot so that the housing unit is foldable and unfoldable;

two displays, a first display being positioned on an outer surface of one of the top housing and the bottom housing and being visible when the housing unit is in a folded state, and a second display being positioned on an inner surface of one of the top housing and the bottom housing and not being visible when the housing unit is in the folded state;

a camera unit for taking an image of a subject through a camera lens that is positioned on one of the outer surface and the inner surface of one of the top housing and the bottom housing, so as to be visible in a same view as one of the displays when the housing is in an unfolded state;

judgment means for judging whether the housing unit is in the unfolded state or the folded state; and display control means for having, when the judgment means judges that the housing unit is in the unfolded state, the taken image of the subject displayed on at least one of the displays directly after the image has been taken, wherein the first display is fixed on the outer surface of the housing unit, and the second display is fixed on the inner surface of the housing unit, the foldable mobile communication terminal is a mobile telephone that includes numeric keys for receiving an input of a telephone number, the numeric keys being on a same surface as one of the first display and the second display, and the display control means further, when the judgment means judges that the housing unit is in the folded state, has the taken image of the subject displayed on the first display.

5. The foldable mobile communication terminal, of claim 4 wherein the camera unit takes an image of a subject through a camera lens that is positioned on an outer surface of the same top housing or bottom housing as the first display, so as to be visible in a same view as the first display when the housing is in an unfolded state;

the foldable mobile communication terminal further comprises:

instruction receiving means responsive to when the housing is in the folded state, for receiving from a user (a) a preparation instruction for having images of a subject displayed on at least one of the displays successively after each image has been taken, and (b) a still image taking instruction for having a still image of the subject displayed on at least one of the displays; and the display control means has the images displayed on the first display, on the instruction receiving means receiving the preparation instruction, and has the still image displayed on the first display, on the instruction receiving means receiving the still image taking instruction.

6. A foldable mobile communication terminal-comprising:

a housing unit that is composed of a top housing and a bottom housing that are connected via a connection unit that acts as a pivot so that the housing unit is foldable and unfoldable;

two displays, a first display being positioned on an outer surface of one of the top housing and the bottom housing and being visible when the housing unit is in a folded state, and a second display being positioned on an inner surface of one of the top housing and the bottom housing and not being visible when the housing unit is in the folded state;

a camera unit for taking an image of a subject through a camera lens that is positioned on one of the outer surface and the inner surface of one of the top housing and the bottom housing so as to be visible in a same view as one of the displays when the housing is in an unfolded state;

judgment means for judging whether the housing unit is in the unfolded state or the folded state; and display control means for having, when the judgment means judges that the housing unit is in the unfolded state, the taken image of the subject displayed on at least one of the displays directly after the image has been taken, wherein the first display is fixed on the outer surface of the housing unit, and the second display is fixed on the inner surface of the housing unit, the foldable mobile communication terminal is a mobile telephone that includes numeric keys for receiving an input of a telephone number, the numeric keys being on a same surface as one of the first display and the second display, the camera lens is positioned on a different outer surface of the housing unit to the first display, and the display control means, when the judgment means judges that the housing unit is in the unfolded position, has the image displayed on the first display in a direction that is upside-down compared to a direction in which images are displayed when the judgment step judges that the housing unit is in the folded position.

7. A foldable mobile communication terminal, comprising a housing unit that is composed of a top housing and a bottom housing that are connected via a connection unit that acts as a pivot so that the housing unit is foldable and unfoldable;

two displays, a first display being positioned on an outer surface of one of the top housing and the bottom housing and being visible when the housing unit is in a folded state, and a second display being positioned on an inner surface of one of the top housing and the bottom housing and not being visible when the housing unit is in the folded state;

a camera unit for taking an image of a subject through a camera lens that is positioned on one of the outer surface and the inner surface of one of the top housing and the bottom housing, so as to be visible in a same view as one of the displays when the housing is in an unfolded state;

judgment means for judging whether the housing unit is in the unfolded state or the folded state; and display control means for having, when the judgment means judges that the housing unit is in the unfolded state, the taken image of the subject displayed on at least one of the displays directly after the image has been taken, wherein the first display is fixed on the outer surface of the housing unit and the second display is fixed on the inner surface of the housing unit, the foldable mobile communication terminal is a mobile telephone that includes numeric keys for receiving an input of a telephone number, the numeric keys being on a same surface as one of the first display and the second display, the display control means has, when the judgment means judges that the housing unit is in the unfolded state, the taken image of the displayed on one of the displays, the display control means further includes:

a user instruction receiving unit for receiving a display selection instruction for switching over the display to perform image display, and the display control means, on the user instruction receiving unit receiving the display selection instruction, has the display performing image display turned off and the image displayed on the selected display.

8. A display control method for a foldable mobile communication terminal that includes (a) a top housing and a bottom housing that are connected via a connection unit that acts as a pivot so that the housing unit is foldable and unfoldable, (b) two displays, a first display being positioned on an outer surface of one of the top housing and the bottom housing and being visible when the housing unit is in a folded state, and a second display being positioned on an inner surface of one of the top housing and the bottom housing and not being visible when the housing unit is in the folded state, and (c) a camera unit for taking an image of a subject through a camera lens that is positioned on one the outer surface and the inner surface of one of the top housing and the bottom housing so as to be visible in the same view as one of the displays when the housing is in an unfolded state, the display control method comprising:

a judgment step for judging whether the housing is in the unfolded state or in the folded state; and a display control step, when the judgment step judges that the housing unit is in the unfolded state, and for having the taken image displayed on at least one or the two displays, the first display is fixed on the front surface of the housing and the second display is fixed on the back surface of the housing, and the foldable mobile communication terminal is a mobile telephone that includes a numeric key pad for inputting a telephone number, the numeric key pad being on a same surface as one of the first display and the second display, the camera lens is positioned on a different outer surface of the housing to the first display, and the display control step, when the judjement step judges that the housing is in the unfolded position, has the image displayed on the first display in a direction that is upside-down compared to a direction in which images are displayed when the judgment step judges that the housing unit is in the folded position.

* * * * *